United States Patent [19]

Brown

[11] Patent Number: 5,655,011

[45] Date of Patent: Aug. 5, 1997

[54] SELECTION OF TERMINAL EQUIPMENT IN RESPONSE TO A DATA MESSAGE RECEIVED DURING SILENT INTERVALS OF RINGING

[75] Inventor: Edwin Zane Brown, Westminster, Colo.

[73] Assignee: Lucent Technologies Inc., Murray Hill, N.J.

[21] Appl. No.: 507,622

[22] Filed: Jul. 26, 1995

[51] Int. Cl.$^6$ .............................. H04M 1/57; H04M 1/64; H04M 11/08

[52] U.S. Cl. .................. 379/93.06; 379/67; 379/142; 379/386; 379/106.06; 379/100.16

[58] Field of Search ................................ 379/142, 106, 379/107, 105, 96, 100, 201, 245, 246, 247, 67, 88, 373, 386, 189, 199

[56] References Cited

U.S. PATENT DOCUMENTS

| | | | |
|---|---|---|---|
| 4,551,581 | 11/1985 | Doughty | 379/94 |
| 4,567,323 | 1/1986 | Lottes et al. | 379/201 |
| 4,582,956 | 4/1986 | Doughty | 379/94 |
| 5,054,055 | 10/1991 | Hanle et al. | 379/142 |
| 5,228,080 | 7/1993 | Nutter et al. | 379/373 |
| 5,343,516 | 8/1994 | Callele et al. | 379/98 |
| 5,388,150 | 2/1995 | Schneyer et al. | 379/67 |
| 5,394,461 | 2/1995 | Garland | 379/106 |
| 5,452,343 | 9/1995 | Garland et al. | 379/106 |
| 5,467,390 | 11/1995 | Brankley | 379/229 |
| 5,473,671 | 12/1995 | Partridge, III | 379/59 |

*Primary Examiner*—Thomas W. Brown
*Attorney, Agent, or Firm*—John C. Moran

[57] ABSTRACT

Responding by telcommunication terminals to data messages received during the silent intervals of ringing to immediately answer a call, perform monitoring activities, provide selective answering of incoming calls, and perform control functions. For providing selective answering, telephone sets utilizing the invention monitor the incoming data message to determine if an identification code of the telephone set is contained within that message. If the identification code of the telephone set is within the message, the telephone allows ringing at that set. If the identification code of the telephone is not in the data message, the telephone counts the number of ringing cycles, and, once this count becomes greater than a predetermined number, the telephone set allows ringing at the set. For performing monitoring activities, a remote utility meter reader is responsive to it's identification code in a data message to immediately answer the incoming call from a public utility company computer before ringing starts. After answering the call, the meter reader establishes a communication session with the public utility company computer to allow the transfer of utility usage to the public utility computer. Similarly, fax, computers, and answering machines are responsive to their identification code in a data message to immediately answer the call. In addition, for performing control functions, a control unit utilizing the invention recognizes its identification code and additional data to either turn on or turn off some device connected to the control unit.

15 Claims, 9 Drawing Sheets

SELECTION OF TERMINAL EQUIPMENT IN RESPONSE TO A DATA MESSAGE RECEIVED DURING SILENT INTERVALS OF RINGING

CROSS-REFERENCE TO RELATED APPLICATION

E. Z. Brown 3, "Transmission of a Data Message During Silent Intervals of Ringing for Selection of Terminal Equipment", U.S. patent application No. 08/507,617, filed Jul. 26, 1995.

The above application is being filed concurrently with the present application and is assigned to the same assignee.

TECHNICAL FIELD

This invention relates to telecommunication terminal equipment, and, in particular, to the transmission of data messages during the silent interval of ringing.

BACKGROUND OF THE INVENTION

Within hoes and small businesses there is a proliferation of telecommunication terminals connected to a single telephone link. Although, ISDN links have been introduced into the telecommunication public network, the vast majority of small businesses and private homes are still served by analog telephone links. Even in the average hone, one finds a plurality of telephones, answering machines, computers, and fax machines; all of which are connected to a single analog telephone link. In addition, the public utility provider of water, electricity, and natural gas have long wanted to red the utility meters measuring the usage of these three items via telephone links without having to install dedicated links or to utilize an existing telephone link that alerted the customers in their homes. Further, the public utility companies could use control over electrical consumption within homes to do load averaging. Finally, whereas it is convenient to have a plurality of telephone sets each connected to a single analog telephone link, it would be desirable if a caller could preselect one of those telephone sets and only that telephone set would ring for the incoming call from the caller.

ISDN basic rate interface (BRI) links could potentially solve many of the problems set forth in the previous paragraph; however, it will be many years before ISDN BRI links replace any sizable portion of the existing analog telephone links. This is largely true because of the large amount of customer owned telephone equipment.

Within the prior art, incoming calling line identification (ICLID) data messages are transmitted during the silent intervals of the ringing on an analog telephone link of an incoming call. However, ICLID data messages only contain information related to the identity of the calling party. U.S. Pat. No. 4,582,956 discloses a device for extracting the telephone number or other source information from an ICLID data message and displaying that information to the called party. In addition, U.S. Pat. No. 5,228,080 discloses using a data message that consists of the word "private" to stop the called telephone set from ringing and to provide a voice message back to the calling party informing that party that the called party does not accept calls from individuals who wish to keep their identity unknown. The word "private" is transmitted as the ICLID message when the caller does not want their identity known. Other systems have made similar use of the identification of the calling party.

SUMMARY OF THE INVENTION

The foregoing problems are solved, and a technical advance is achieved by an apparatus and method in telecommunication terminals that can respond to data messages received during the silent intervals of ringing to immediately answer a call, perform monitoring activities, provide selective answering of incoming calls, and perform control functions. Advantageously, for providing selective answering, telephone sets utilizing the invention monitor the incoming data message to determine if an identification code of the telephone set is contained within that message. If the identification code of the telephone set is within the message, the telephone allows ringing at that set. If the identification code of the telephone is not in the data message, the telephone counts the number of ringing cycles, and, once this count becomes greater than a predetermined number, the telephone set allows ringing at the set. For performing monitoring activities, a remote utility meter reader is responsive to it's identification code in a data message to immediately answer the incoming call from a public utility company computer before ringing starts. After answering the call, the meter reader establishes a communication session with the public utility company computer to allow the transfer of utility usage to the public utility computer. Similarly, fax, computers, and answering machines are responsive to their identification code in a data message to immediately answer the call. In a small business, the immediate answering by a fax or a computer allows the telephone link to be efficiently used for other business purposes that utilize voice communication. The advantage of having an answering machine immediately answer an incoming call is that it allows the caller to leave a voice message without disturbing the called party. The automatic leaving of a voice message has proven extremely useful in large companies that have voice messaging systems. In addition, for performing control functions, a control unit utilizing the invention recognizes its identification code and additional data to either turn on or turn off some device connected to the control unit. The control unit also goes off hook for a predetermined amount of time before going on hook so as to stop the incoming call from ringing a telephone attached to the analog telephone link.

DETAILED DESCRIPTION

Figure 1:
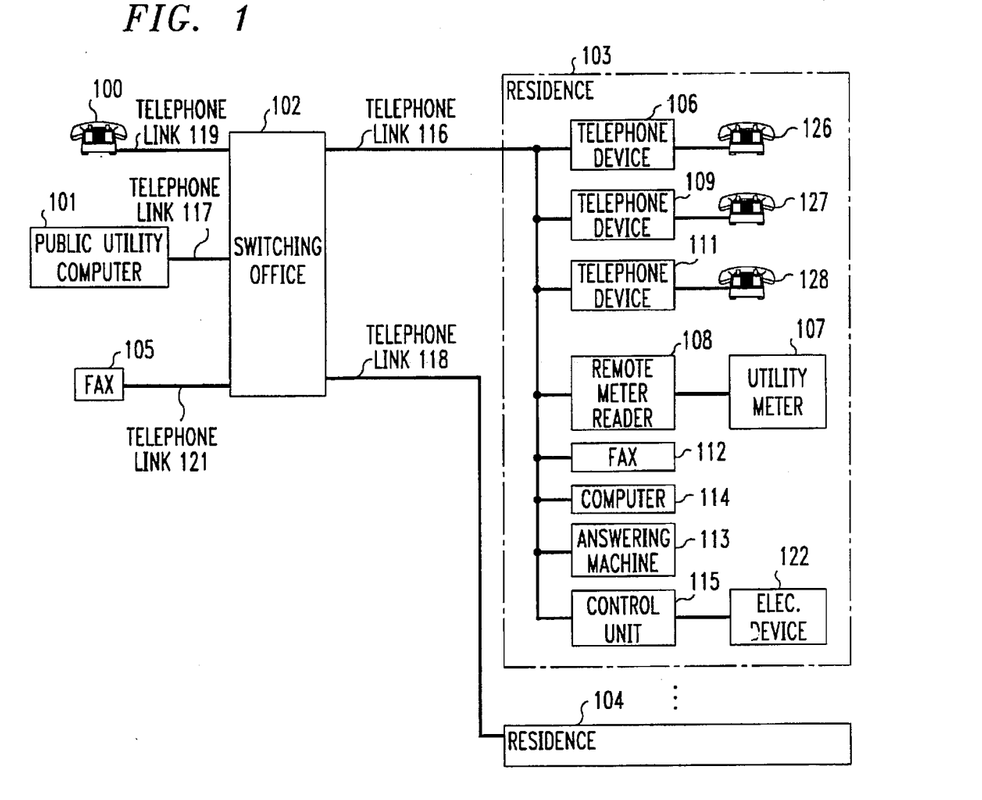
FIG. 1 illustrates a telecommunication system interconnected to a plurality of telephone terminals within a residence.

FIG. 1 illustrates switching office 102 connecting a plurality of residences 103-104 to telephone 100, public utility computer 101 and fax machine 105. In addition, the various telecommunication units at each residence can communicate with similar telecommunication devices in other residencies. The operation of switching office 102 is described in greater detail in the above-referenced co-pending application that is hereby incorporated by reference. The other residences have similar telecommunication terminals as illustrated for residence 103. In addition, each residence may have fewer or more telecommunication units. In particular, each residence could have a plurality of control units. The telephone links illustrated in FIG. 1 are assumed to be analog telephone links; although, as set forth in the co-pending application the telephone links from public utility computer 101 or fax 105 could be ISDN links with switching office 102 performing the necessary translation for transmission of information on telephone links 116 or 118. Data messages sent on telephone links 116 and 118 are sent during the silent intervals of ringing. This method of transmission is described in U.S. Pat. No. 4,551,581 that is hereby incorporated by reference.

Consider now how public utility computer 101 reads the electrical usage from utility meter 107. Note, that utility meter 107 could also be measuring the consumption of natural gas or water. As described in the co-pending application, public utility computer 101 utilizes dual tone multifrequency (DTMF) dialing to place a telephone call to telephone link 116 and includes the DTMF digit that specifies the identification code of remote meter reader 108. Advantageously, all remote meter readers utilize the same identification code. In response to the DTMF dialing, switching office 102 sets up a connection between telephone link 117 and telephone link 116 and transmits the DTMF identification digit on telephone link 116. Remote meter reader 108 is responsive to the transmission of the identification digit to immediately go off hook before actual ring signals are transmitted by switching office 102 on telephone link 116. Remote meter reader 108 includes a controller that sets up a communication session via an internal modem with a similar modem in public utility computer 101. Public utility computer 101 utilizing this telecommunication session then requests that remote meter reader 108 transmit the usage information from utility meter 107. In response, remote meter reader 108 reads the usage consumption information from utility meter 107 and transmits this information to public utility computer 101. Remote meter reader 108 then causes the internal modem to go on hook thereby terminating the telephone call set up between telephone link 117 and telephone link 116. By remote meter reader 108 immediately going off hook before ringing signals are transmitted, public utility computer 101 can read the consumption usage at the various residences during the early morning hours and not to disturb the residents. In addition, if a person in residence 103 goes off hook on handset 126 during the communication session, public utility computer 101 is aware of the user's actions since data transmission results in errors. Once becoming aware that a user had gone off hook with the telephone, public utility computer 101 immediately terminates the telephone call between telephone link 117 and telephone link 116. This allows the user in residence 103 to place their telephone call. Public utility computer 108 then tries to establish a communication session with remote meter reader 108 at some later point in time.

A computer such as public utility computer 101 establishes a communication session with computer 114 in the following manner. Computer 101 sets up a telephone call between telephone link 117 and telephone link 116 as previously described but transmits the identification digit for computer 114. Computer 114 is responsive to its identification information in the data message to immediately go off hook on telephone link 116 before actual ringing signals are sent by switching office 102 on telephone link 116. Once going off hook, computer 114 utilizes an internal modem to establish a communication session with an internal modem of computer 101.

Consider now the operations of telephone devices 106, 109, and 111 which provide interfaces for handsets 126, 127, and 128, respectively. These telephone sets each have a unique identification code. If an identification code is present, only the telephone device that matches that identification code will ring its attached handset. However, if after some predetermined amount of time, the call is not answered, all telephone sets ring their attached handsets. The use of identification information to initially ring only one of the handsets in residence 103 allows the implementation of individually addressed extensions. Consider the following example with respect to a plurality of telephone sets. A caller utilizing telephone handset 100 places a call to telephone link 116 by dialing DTMF digits to switching office 102 via telephone link 119. The caller also knows the identification digit for telephone device 106. After dialing the telephone number of telephone link 116, the caller dials the identification code of telephone device 106. As described in the co-pending application, switching office 102 is responsive to the resulting DTMF digits to set up a call between telephone link 119 and telephone link 116 and to transmit the identification code in a data message before ringing. Telephone device 106 is responsive to receipt of its identification code in the data message to allow the ringing signals to ring handset 126. Telephone devices 109 and 111 are responsive to the data message not containing their own identification codes to not allow the ringing signals to cause ringing on handsets 127 and 128. After transmission of the data message, switching office 102 transmits a display message that identifies set 100. Telephone device 106 is responsive to this display signal to display the caller's identification. Telephone devices 109 and 111 will also start ringing on handsets 127 and 128 if the call is not answered after a predetermined number of ring cycles. Telephone devices 109 and 111 also display the name of the calling party at the same time as telephone device 106. All of the telephone sets continue to display the name of the calling party until the call is discontinued. This notifies the telephone sets that there is a call in progress.

If the calling party using telephone handset 100 simply wishes to leave a voice message for residence 103, the calling party sets up the call as previously described but includes the identification code for answering machine 113. Upon receiving its identification code, answering machine 113 immediately goes off hook and begins its operation. The result is that handsets 126, 127, and 128 are never rung. This allows the calling party using telephone handset 100 to leave a message without disturbing any individual within residence 103.

Consider now how a facsimile message is sent from fax 105 to fax 112. The dialing of the directory number for telephone link 116 and the identification code for fax 112 can be done manually on fax 105 or it can be preprogrammed into fax 105. Assuming that the telephone directory number and identification code for fax 112 are preprogrammed, when the user of fax 105 pushes the appropriate button, fax 105 transmits the directory number and the identification number to switching office 102. Switching office 102 is responsive to this information to set up a connection between telephone link 121 and telephone link 116. Further, switching office 102 transmits the identification code in a data message on telephone link 116. When fax 112 receives its identification code in the data message, fax 112 immediately goes off hook and begins the facsimile protocol exchange with fax 105. When fax 112 has received the facsimile message, it goes on hook, thereby terminating the call between telephone link 121 and telephone link 116.

Control unit 115 can have one of two embodiments. In the first embodiment, control unit 115 is responsive to a data message containing its identification code and a command to either turn on or turn off a connected electrical device. Control unit 115 also upon detecting the data message goes off hook and then back on hook to terminate the call being placed to telephone link 116. The second embodiment of control unit 115 functions similarly to the remote meter reader in that a modem is utilized to receive the control information and only an identification code is transmitted by switching office 102 in the data message.

Figure 2:
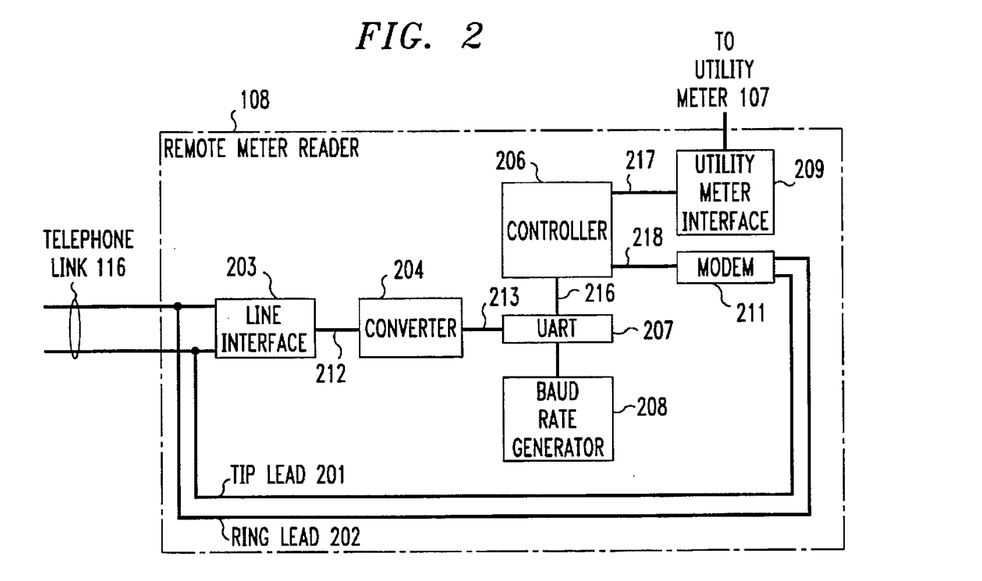
FIG. 2 illustrates a remote meter reader.

FIG. 2 illustrates, in block diagram form, remote meter reader 108. The manner in which line interface 203, converter 204, UART 207, and baud rate generator 208 cooperate with controller 206 to receive a digital message transmitted on telephone link 116 during the silent intervals of ringing is described in U.S. Pat. No. 4,551,581. Modem 211 is a standard modem with the exception that it does not utilize a ting detector circuit to determine when to go off hook on tip lead 201 and ring lead 202. A signal transmitted on bus 218 by controller 206 designates to modem 211 when it should go off hook. When modem 211 is finished with a data call, it goes on hook and signals controller 206 by transmission of a signal on bus 218 in a standard manner that it has gone on hook. This signal defines to controller 206 that the data call is complete. In addition, controller 206 and modem 211 interact over bus 218 in a standard manner. Controller 206 utilizes utility meter interface 209 to read the usage information from utility meter 107. Such utility meter interfaces are well known in the art. Controller 206 is a self contained computer having input output capability, RAM and ROM memories.

Figure 7:
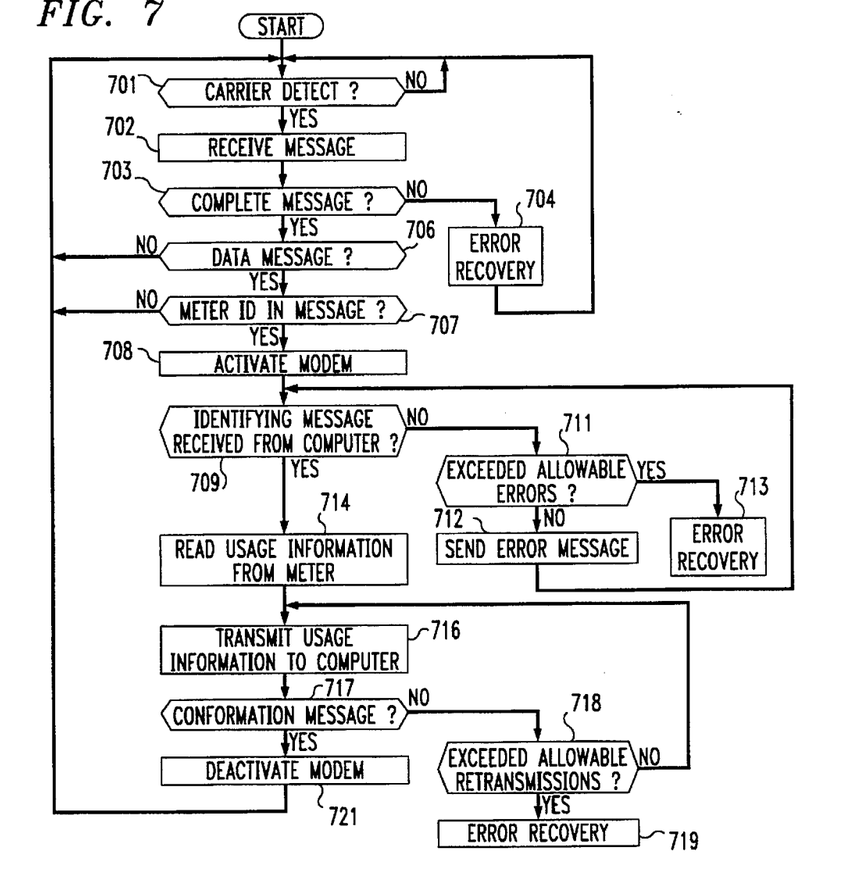
FIG. 7 illustrates, in flow chart form, functions performed by a remote meter reader in accordance with the invention.

To further understand the operation of remote meter reader 108, consider the flow chart illustrated in FIG. 7 that details the operations of controller 206. Decision block 701 waits until UART 207 transmits via bus 216 a carrier detect signal to controller 206. Execution of block 702 then reads the data message being transmitted over telephone link 116 via line interface 203, converter 204, and UART 207. The functions performed by block 702 are described in detail in U.S. Pat. No. 4,582,956. Decision block 703 determines if a complete message was received. If the answer is no, error recovery block 704 is executed. If a complete message was received, control is transferred to decision block 706 to determine if a data message was received. If the answer is no, control is transferred back to decision block 701. If the answer is yes, decision block 707 determines if the remote meter reader's identification code is in the message. If the answer is no, control is transferred back to decision block 701.

If the remote meter reader's identification code is in the message, control is transferred to block 708 which activates modem 211. Modem 211 goes off hook and exchanges the modem protocol with the modem in public utility computer 101 of FIG. 1. Decision block 709 verifies whether the proper identifying message (identifying public utility computer 101) is received. If the answer is no, control is transferred to decision block 701 which determines if the number of attempts in receiving a correct identifying message has been exceeded. If the answer is yes, control is transferred to block 713 for error recovery. If the answer in decision block 711 is no, control is transferred to block 712 which transmits an error message to public utility computer 101 and then transfers control back to decision block 709. The identifying message is intended to prevent unauthorized individuals from gaining access to controller 206.

Returning to decision block 709, if the answer is yes, control is transferred to block 714 that utilizes utility meter interface 209 to read the usage information from utility meter 107. Control is then transferred to block 716 which transmits the usage information to public utility computer 101. Decision block 717 waits for the confirmation message from public utility computer 101. When this message is received, block 721 deactivates modem 211 which drops the call and control is transferred back to decision block 701. If a confirmation message is not received by decision block 717, control is transferred to decision block 718. The latter decision block determines if the allowable number of retransmissions of the usage information to public utility computer 101 has been exceeded. If it has not, control is transferred back to block 716. However, if the allowable number of retransmissions has been exceeded, control is transferred to block 719 for error recovery.

Figure 3:
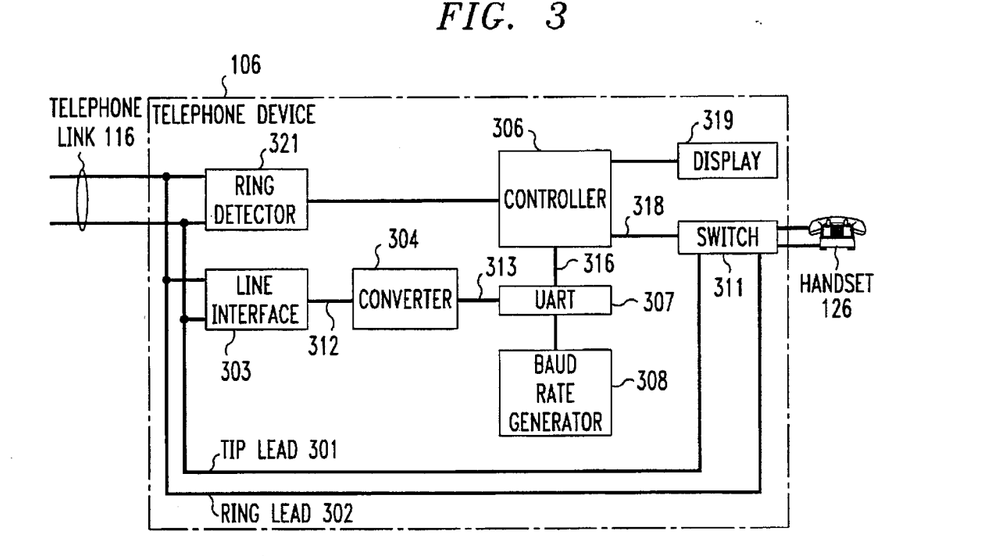
FIG. 3 illustrates a telephone device in accordance with the invention.

FIG. 3 illustrates, in block diagram form, greater detail of telephone device 106. Telephone sets 109 and 111 are identical in design. Ring detector 321 is utilized by controller 306 to determine the state of telephone link 116. In particular, controller 306 uses detector 321 to determine if handset 126 is on or off hook and if ringing is present. Switch 311 is utilized to connect tip lead 301 and ring lead 302 to handset 126. Handset 309 has the functions of a normal telephone. Handset 126 is rung by actual ringing signals being received on tip lead 301 and ring lead 302, and a user of handset 126 can place telephone calls. Controller 306 uses switch 311 to connect handset 126 to the tip and ring leads except when the identification code of another telephone has been received in a data message. Display 319 is utilized to display the caller ID information.

Figure 9:
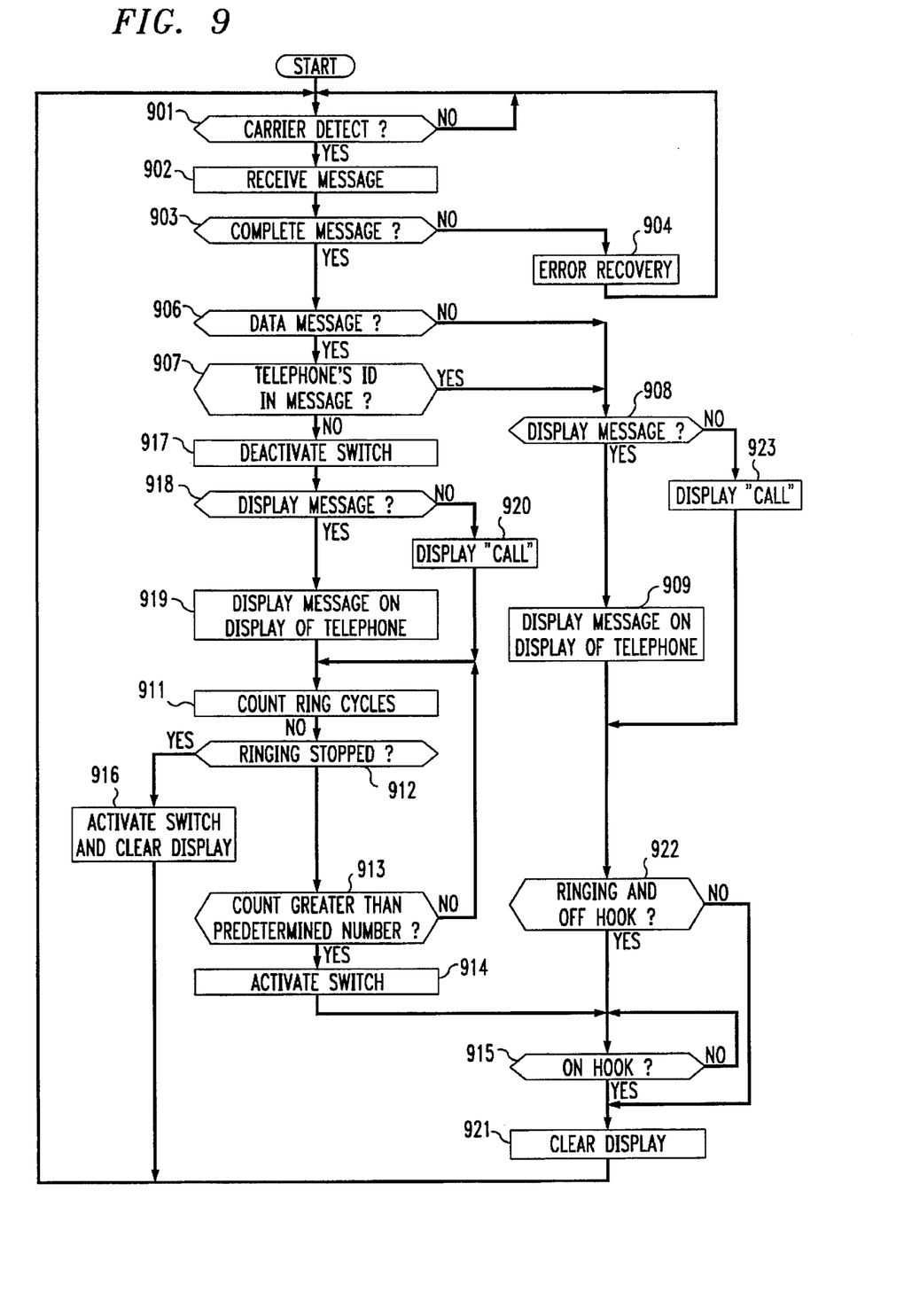
FIG. 9 illustrates, in flow chart form, the functions performed by a telephone device in accordance with the invention.

FIG. 9 illustrates in greater detail the operations performed by controller 306 in telephone device 106. Blocks 901-904 function in the same manner as blocks 701-704 in FIG. 7. When decision block 906 is executed, if the message is not a data message, control is transferred to decision block 908. Decision block 908 determines if a display message was received. If a display message was received, block 909 displays the message on display 319 of FIG. 3. If the answer is no in decision block 908, block 923 displays the word "call" on display 319 to indicate an active call on telephone link 116. Regardless of whether the answer is yes or no in decision block 908, control is transferred to decision block 922. Decision block 922 determines whether ringing signals were received and some terminal device has gone off hook. If the answer is yes to both of these then control is passed to decision block 915 which determines when telephone link 116 is in the on hook state. Ring detector 321 is utilized to make the ringing and hook state decisions. When the other terminal device goes on hook, block 921 clears display 319. If the answer in decision block 922 was no, control is immediately transferred to decision block 921.

Returning to decision block 906, if the answer is yes, decision block 907 determines if the telephone's identification code is in the data message. If the answer is yes, control is transferred to decision block 908 whose operation has already been described. Note, that controller 306 normally has switch 311 closed so that handset 126 is connected to tip and ring leads 301 and 302. Hence, there is no need after a determination by decision block 907 that the telephone's identification code is in the message to activate switch 311.

Returning once again to decision block 907, if the telephone's identification code is not in the message, control is transferred to block 917 which deactivates switch 311 so that handset 126 is not connected to tip and ring leads 301 and 302. Decision block 918 determines if a display message has been received. If the answer is yes, block 919 displays the message on display 319. If the answer is no in decision block 918, control is transferred to block 920 which displays the word "call" in display 319 to indicate an active call. After block 920, control is transferred to block 911 which counts ring cycles. Block 911 also determines if any ringing signals have occurred, and if no ringing signals have occurred, block 911 transfers control to decision block 912 which in turn transfers control to block 916. In normal operation, after each ring cycle, block 911 transfers control to decision block 912 which determines if ringing signals have stopped. If ringing signals have not stopped, control is transferred to decision block 913 which determines if a count greater than a predetermined number has been reached. Once the number of ring cycles has exceeded the predetermined number, then ringing signals are applied to handset 309 so that a user is alerted to the call by ringing of that telephone set. Note, that before the predetermined number is exceeded, the user at telephone device 106 is aware that there is an incoming call since a message is displayed on display 319 by blocks 919 or 920. If the answer in decision block 913 is yes, control is transferred to block 914 which activates switch 311 which applies ringing signals to handset 126. After execution of block 914, control is transferred to decision block 915 whose operations have already been described. Returning to decision block 912, when it is determined that ringing signals have stopped or never started, control is transferred to block 916 which activates the switch 311 and clears display 319.

Figure 4:
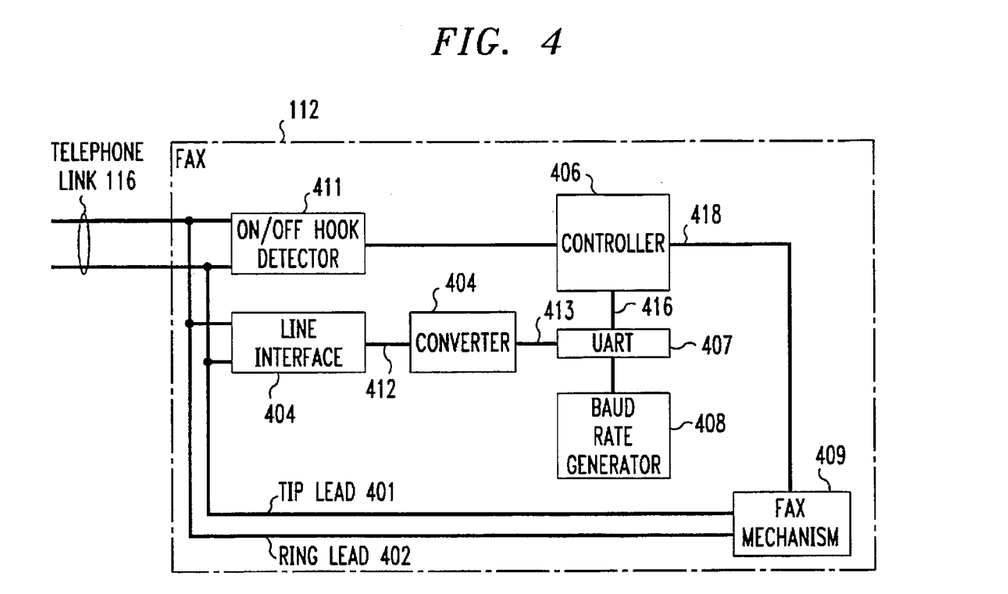
FIG. 4 illustrates a fax machine in accordance with the invention.

FIG. 4 illustrates in greater detail fax 112. Fax mechanism 409 is a standard fax machine with the exception that it does not rely on a ring detector circuit to determine when it should go off hook on tip and ring leads 401 and 402. Rather, fax mechanism 409 goes off hook upon transmission of a signal on conductor 418 from controller 406. Controller 406 utilizes on/off hook detector 411 to determine the on/off hook state of telephone link 116.

Figure 8:
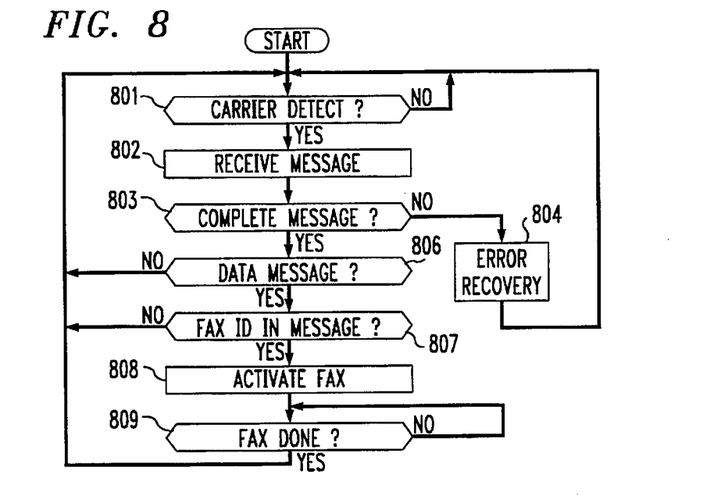
FIG. 8 illustrates, in flow chart form, functions performed by a fax machine in accordance with the invention.

FIG. 8 illustrates in greater detail the operation of fax 112 of FIG. 4. Blocks 801-804 are identical in operation to those of blocks 701-704 of FIG. 4. When control is received by decision block 806, this decision block determines if a data message has been received. If the answer is no, control is transferred back to block 801. If the answer is yes, decision block 807 determines if the identification code for fax 112 is in the data message. If the answer is no, control is again transferred back to decision block 801. If the answer is yes, block 808 activates fax mechanism 409 by the transmission of a signal on conductor 418 by controller 406. Decision block 809 monitors when fax mechanism 409 has completed the call by monitoring the on/off hook state of telephone link 116 utilizing detector 411. When a on hook state is determined, decision block 809 transfers control back to decision block 801.

Figure 5:
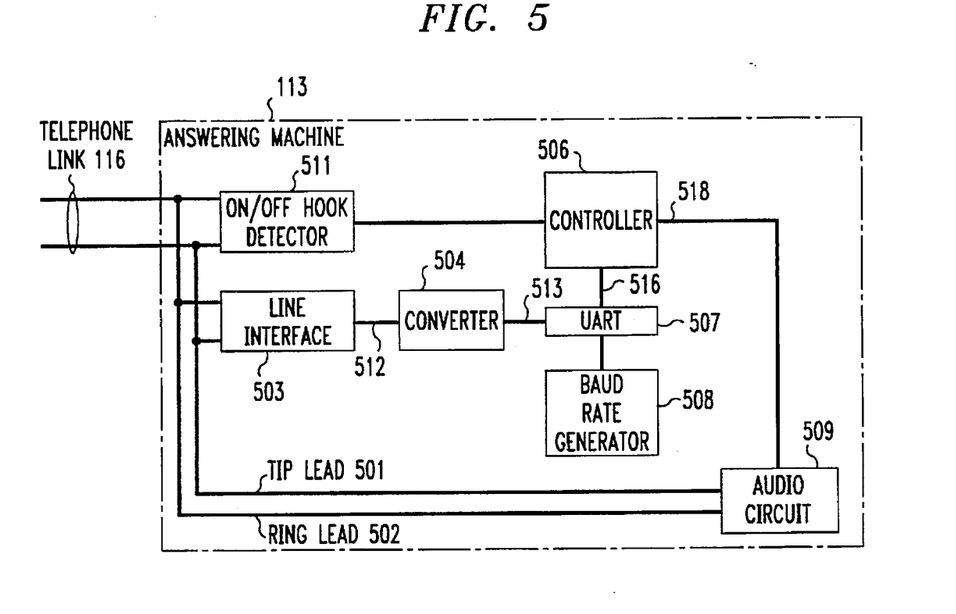
FIG. 5 illustrates an answering machine in accordance with the invention.

FIG. 5 illustrates in greater detail answering machine 113. Audio circuit 509 is a standard answering machine with the exception that it is responsive to a signal transmitted on conductor 518 by controller 506 to go off hook; rather than relying on a ring detector within audio circuit 509 itself. Controller 506 utilizes on/off hook detector 511 to monitor the hook state of telephone link 116.

Figure 14:
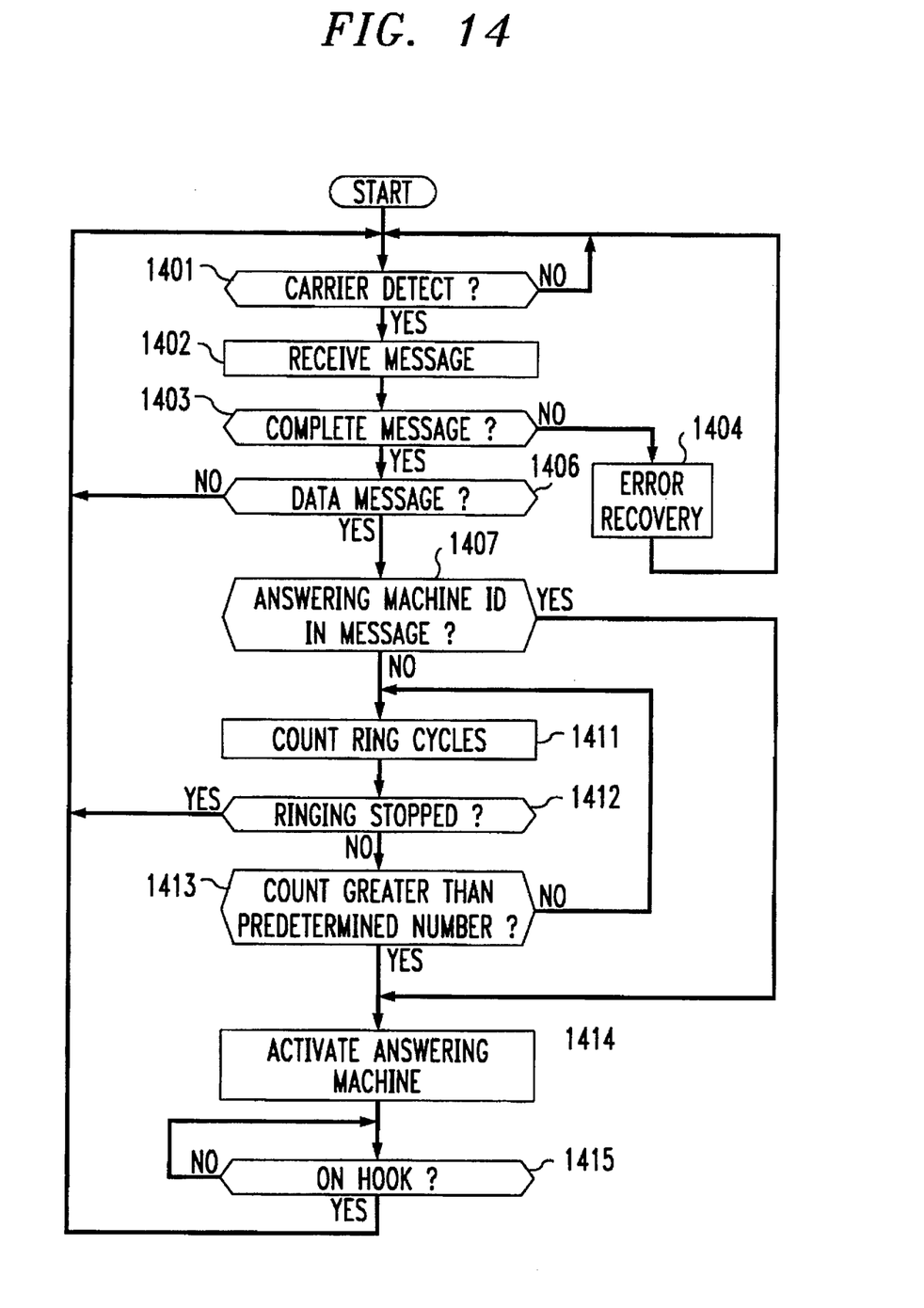
FIG. 14 illustrates, in flow chart form, functions performed by an answering machine in accordance with the invention.

FIG. 14 illustrates in greater detail the functions performed by controller 506. Blocks 1401-1404 are identical in operation to blocks 701-704 of FIG. 7. When control is passed to decision block 1406, the latter decision block determines if a data message was received. If the answer is no, control is transferred back to decision block 1401. If the answer is yes, decision block 1407 determines if the answering machine's identification code is in the data message. If the answer is yes, control is transferred to block 1414 which actuates the answering machine. Audio circuit 509 then performs the standard functions of an answering machine. When audio circuit 509 goes on hook, this is detected by decision block 1415 which transfers control back to decision block 1401.

Returning to decision block 1407, if the answer is no, control is transferred to block 1411. Block 1411 detects if ringing signals are present and transfers control to decision block 1412 for each ring cycle. If the ringing signals have ceased, block 1411 transfers control to decision block 1412 which in turn transfers control to decision block 1401. If ringing signals have not stopped, decision block 1412 transfers control to decision block 1413 which determines if a predetermined number of ring cycles has been exceeded. If this predetermined number of ring cycles has been exceeded, then control is transferred to block 1414 whose operations have already been described. If the answer in decision block 1413 is no, control is transferred back to block 1411.

Figure 6:
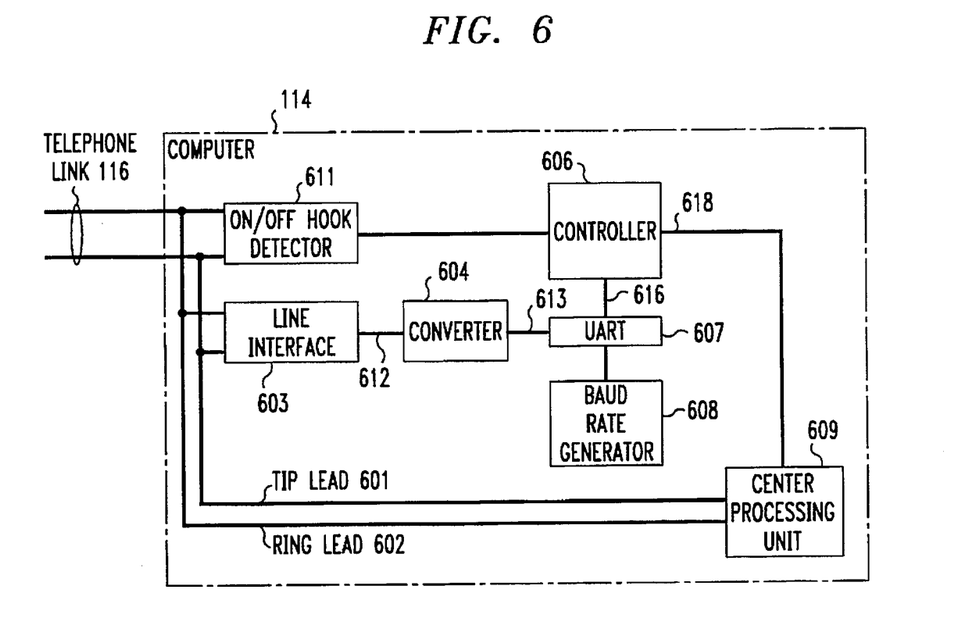
FIG. 6 illustrates a computer in accordance with the invention.

FIG. 6 illustrates in greater detail computer 114. Central processing unit 609 includes a internal modem which responds to a signal on conductor 618 from controller 606 to go off hook. Controller 606 functions with respect to central processing unit 609 in the same manner as described for fax 112 with respect to FIGS. 4 and 8.

Figure 10:
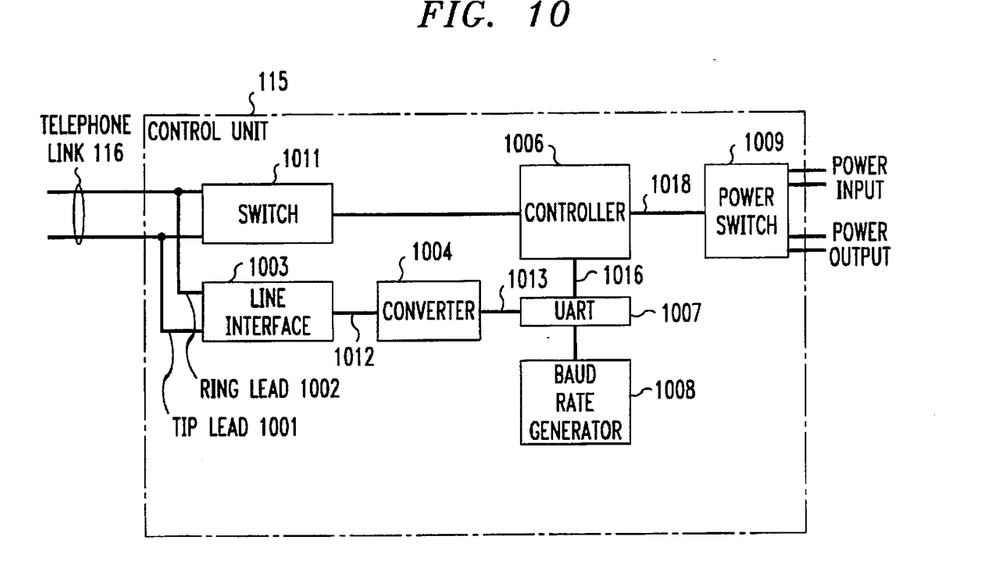
FIG. 10 illustrates a control unit in accordance with the invention.

FIG. 10 illustrates the first embodiment of control unit 115 in greater detail. Controller 1006 is responsive to data messages received via telephone link 116 to turn on or off power switch 1009. Controller 1006 utilizes switch 1011 to go off hook after receiving a data message identifying control unit 115. Controller 1006 then goes back on hook by again operating switch 1011. The purpose of this on hook/off hook is to terminate the incoming call on telephone link 116.

Figure 12:
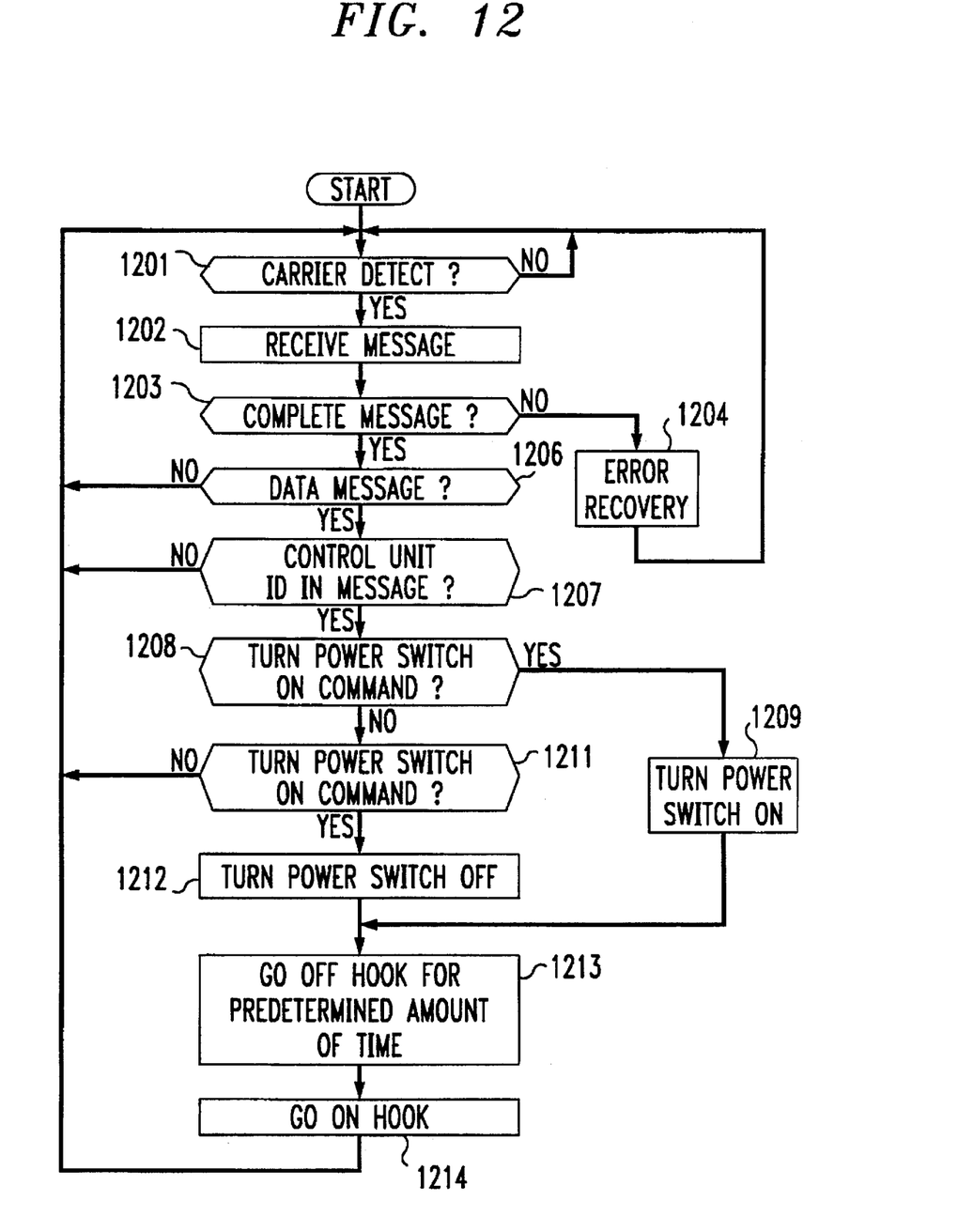
FIG. 12 illustrates, in flow chart form, functions performed by a control unit.

FIG. 12 illustrates in greater detail the functions of controller 1006. The operation of blocks 1201-1206 is identical to the operation of blocks 1401-1406 as previously described with respect to FIG. 14. When control is transferred to decision block 1207, the latter decision block determines if the data message contains the control unit's identification code. If the answer is no, control is transferred to decision block 1201. If the answer is yes in decision block 1207, control is transferred to decision block 1208. Decision block 1208 examines the remainder of the data message to determine if the power switch on command is present. If the answer is yes, control is transferred to block 1209 which rams power switch 1009 on. If the answer is no, control is transferred to decision block 1211 which determines if the command to turn power switch off is present in the received data message. If the answer is no, control is transferred to decision block 1201. If the answer is yes in decision block 1211, control is transferred to block 1212 which turns power switch 1009 off. After execution of either block 1209 or 1212, block 1213 is executed which causes switch 1011 to go off hook for a predetermined amount of time before transferring control to block 1214. Block 1214 actuates switch 1011 so that telephone link 116 is returned to the on hook state. After execution of block 1214, control is transferred back to decision block 1201.

Figure 11:
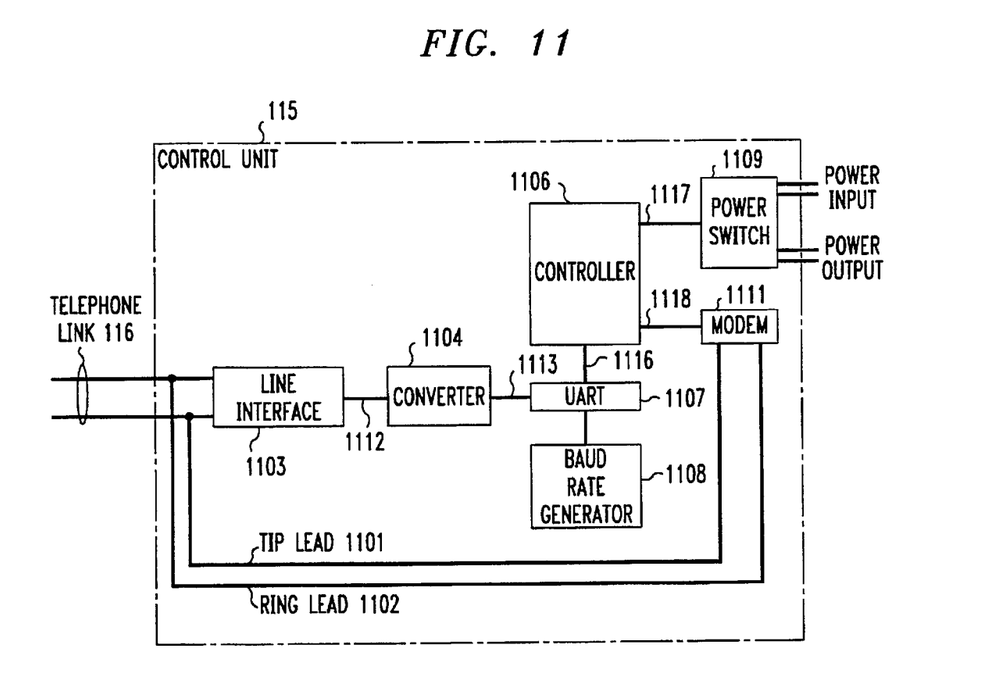
FIG. 11 illustrates another embodiment of a control unit in accordance with the invention.
Figure 13:
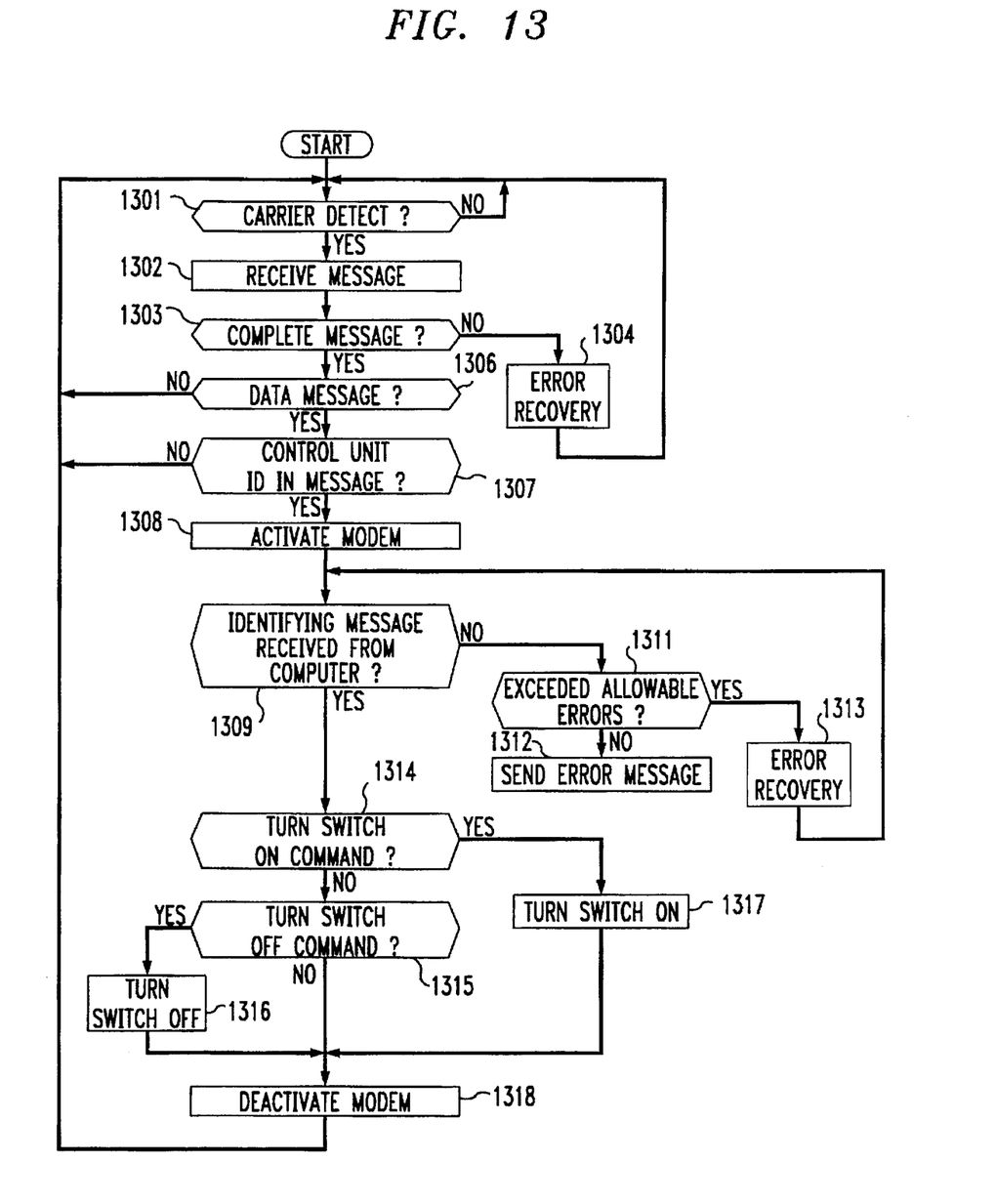
FIG. 13 illustrates, in flow chart form, functions performed by a control unit in accordance with the other embodiment of a control unit.

FIG. 11 illustrates the second embodiment of control unit 115 in greater detail. Controller 1106 functions with respect to modem 1111 in the same manner as controller 206 functioned with respect to modem 211 of FIG. 2. FIG. 13 illustrates, in flow chart form, the details of the operation of controller 1106. Blocks 1301-1307 are identical in operation to blocks 1201-1207 of FIG. 12. When block 1308 receives control, it activates modem 1111. Controller 1106 then establishes a communication session with public utility computer 101 of FIG. 1. Decision block 1309 determines when computer 101 has properly identified itself. If an incorrect identifying message is received, decision block 1309 transfers control to decision block 1311 which determines if the allowable errors/incorrect identifying messages has been exceeded. If the answer is yes, block 1313 performs error recovery. If the answer in decision block 1311 is no, block 1312 sends an error message to computer 101 and transfers control back to decision block 1309. If the answer in decision block 1309 is yes, control is transferred to decision block 1314 which determines if a message containing a command to turn the power switch on has been received. If the answer is yes, block 1317 turns on power switch 1109 and transfers control to block 1318 which deactivates the modem causing the modem to go on hook. If the answer in decision block 1314 is no, decision block 1315 is executed to determine if the identifying message contained the turn switch off command. If the answer is yes, block 1316 turns power switch 1109 off. If the answer in decision block 1315 is no, control is transferred to block 1318 which has been previously described.

It is to be understood that the above-described embodiments are merely illustrative of the principles of the invention and that other arrangements may be devised by those skilled in the art without departing from the spirit and scope of the invention.

The invention claimed is:

1. An apparatus for selecting one of a plurality of terminals connected to an analog telephone link, each terminal comprising:

means for receiving a data message transmitted during a silent interval of ring cycles on an analog telephone link for an incoming call;

means for decoding the data message to obtain a terminal code in the data message;

means for seizing the analog telephone link by a selected terminal upon the terminal code in the data message matching the identification code of said selected terminal;

means for controlling the flow of electrical current from input terminals to output terminals;

the means for controlling responsive to a first control code in the data message to interrupt the flow of electrical current; and the means for controlling further responsive to a second control code in the data message to allow the flow of electrical current.

2. The apparatus of claim 1 wherein the means for seizing further comprises mean for releasing the analog telephone link after a predetermined time interval from receipt of the data message, thereby terminating the call.

3. An apparatus for selecting one of a plurality of terminals connected to an analog telephone link, each terminal comprising:

means for receiving a data message transmitted during a silent interval of ring cycles on an analog telephone link for an incoming call;

means for decoding the data message to obtain a terminal code in the data message;

means for seizing the analog telephone link by a selected terminal upon the terminal code in the data message matching the identification code of said selected terminal;

means for controlling the flow of electrical current from input terminals to output terminals;

means for establishing a communication session with a computer placing the incoming call;

the means for controlling responsive to a first control code received from the computer to interrupt the flow of electrical current; and the means for controlling further responsive to a second control code received from the computer to allow the flow of electrical current.

4. An apparatus for selecting one of a plurality of terminals connected to an analog telephone link wherein a subset of the plurality of terminals are each connected to a telephone handset, each terminal comprising:

means for receiving a data message transmitted during a silent interval of ringing on an analog telephone link for an incoming call;

means for decoding the data message to obtain a terminal code in the data message;

means for performing a control action by a selected terminal upon the terminal code in the data message matching an identification code of said selected terminal;

the means for performing in said selected terminal of the subset of the plurality of terminals comprises means for allowing said selected terminal of the subset of the plurality of terminals to emit audible ringing on said connected telephone handset in response to ringing signals on the analog telephone link upon the terminal code in the data message matching the identification code of said selected terminal of the subset of the plurality of terminals; and said selected terminal of the subset of the plurality of terminals further comprises means for inhibiting the audible ringing of said connected telephone handset upon the terminal code in the data message not matching the identification code of said selected terminal of the subset of the plurality of terminals.

5. The apparatus of claim 4 wherein the means for allowing the audible ringing further allows audible ringing of each of the subset of the plurality of terminals whose identification code does not match the terminal code in the data message upon a predetermined number of ring cycles having occurred for the incoming call.

6. The apparatus of claim 5 wherein each of the terminals further comprises means for detecting a display message during a silent interval of ringing;

means for decoding the display message; and means for displaying the contents of the display message.

7. The apparatus of claim 6 wherein each of the terminals further comprises means for displaying a predefined message upon a display message not being received.

8. The apparatus of claim 4 wherein the means for allowing the audible ringing further allows audible ringing of each of the subset of the plurality of terminals upon no terminal code being in the data message.

9. A method for selecting one of a plurality of terminals connected to an analog telephone link, the method comprising the steps of:

receiving a data message transmitted during a silent interval of ring cycles on an analog telephone link for an incoming call;

decoding the data message to obtain a terminal code in the data message;

seizing the analog telephone link by a selected terminal upon the terminal code in the data message matching the identification code of said selected terminal;

controlling the flow of electrical current from input terminals to output terminals;

the step of controlling responsive to a first control code in the data message to interrupt the flow of electrical current; and the step of controlling further responsive to a second control code in the data message to allow the flow of electrical current.

10. A method for selecting one of a plurality of terminals connected to an analog telephone link, the method comprising the steps of:

receiving a data message transmitted during a silent interval of ring cycles on an analog telephone link for an incoming call;

decoding the data message to obtain a terminal code in the data message;

seizing the analog telephone link by a selected terminal upon the terminal code in the data message matching the identification code of said selected terminal;

controlling the flow of electrical current from input terminals to output terminals;

establishing a communication session with a computer placing the incoming call;

the step of controlling responsive to a first control code received from the computer to interrupt the flow of electrical current; and the step of controlling further responsive to a second control code received from the computer to allow the flow of electrical current.

11. A method for selecting one of a plurality of terminals connected to an analog telephone link wherein a subset of the plurality of terminals are each connected to a telephone handset, the method comprising the steps of:

receiving a data message transmitted during a silent interval of ringing on an analog telephone link for an incoming call;

decoding the data message to obtain a terminal code in the data message;

performing a control action by a selected terminal upon the terminal code in the data message matching an identification code of said selected terminal;

the step of performing in said selected terminal of the subset of the plurality of terminals comprises the step of allowing said selected terminal of the subset of the plurality of terminals to emit audible ringing on said connected telephone handset in response to ringing signals on the analog telephone link upon the terminal code in the data message matching the identification code of said selected terminal of the subset of the plurality of terminals; and the step of performing in said selected terminal of the subset of the plurality of terminals further comprises the step of inhibiting the audible ringing of said connected telephone handset upon the terminal code in the data message not matching the identification code of said selected terminal of the subset of the plurality of terminals.

12. The method of claim 11 wherein the step of allowing the audible ringing further allows audible ringing of each of the subset of the plurality of terminals whose identification code does not match the terminal code in the data message upon a predetermined number of ring cycles having occurred for the incoming call.

13. The method of claim 12 further comprises the steps of detecting a display message during a silent interval of ringing;

decoding the display message; and displaying the contents of the display message.

14. The method of claim 13 further comprises the step of displaying a predefined message upon a display message not being received.

15. The method of claim 11 wherein the step of allowing the audible ringing further allows audible ringing of each of the subset of the plurality of terminals upon no terminal code being in the data message.

* * * * *